Inventors:
KURT SCHRÖTER
BERNHARD WALTERSCHEID-MÜLLER

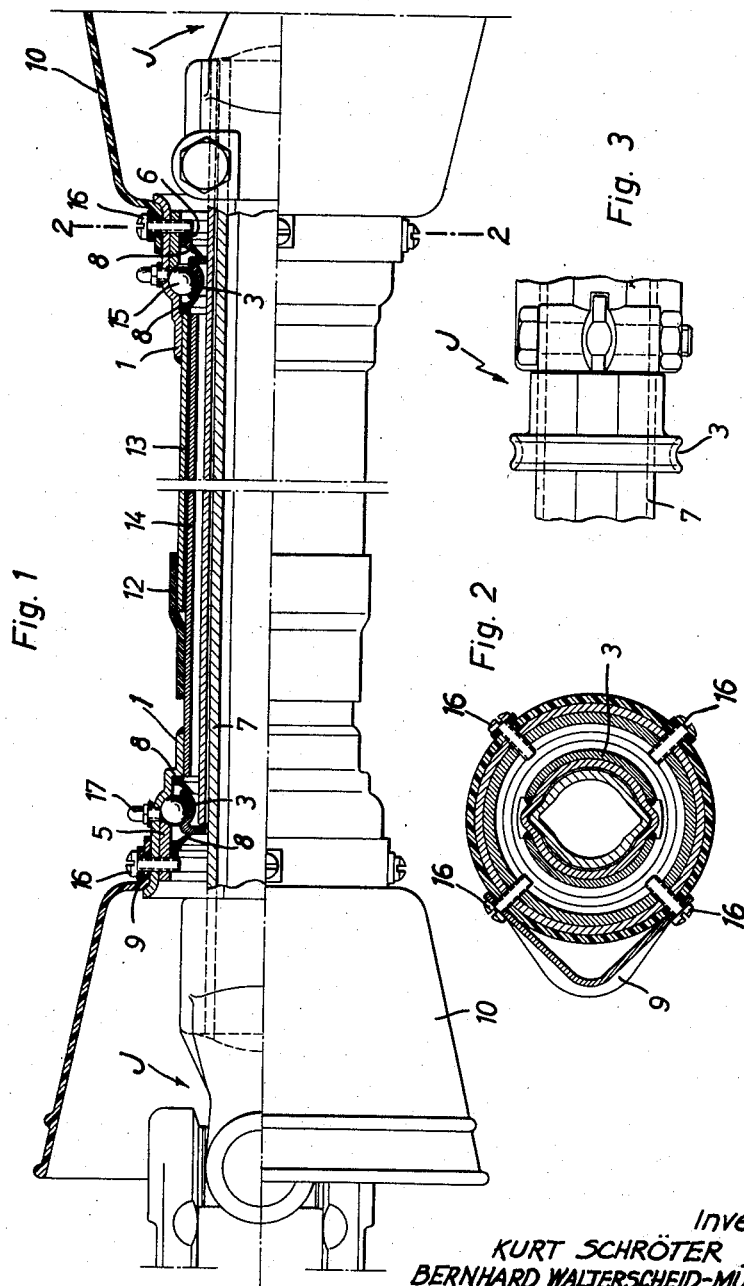

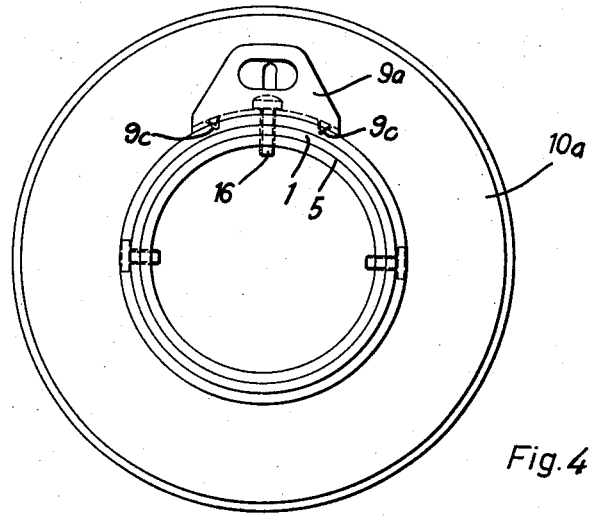
Fig. 4
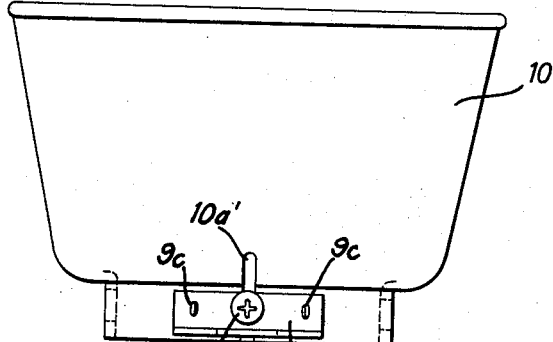
Fig. 6   Fig. 5
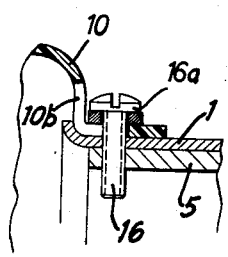
Fig. 7
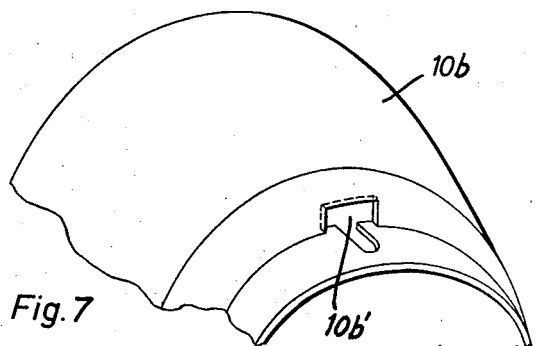
Inventors:
KURT SCHRÖTER
BERNHARD WALTERSCHEID-MÜLLER
By Toulmin & Toulmin
Attorneys Sept. 13, 1960     K. SCHRÖTER ET AL     2,952,142
PROTECTIVE ARRANGEMENT Filed Feb. 24, 1959     6 Sheets-Sheet 3

By Toulmin & Toulmin
Attorneys

Fig. 10
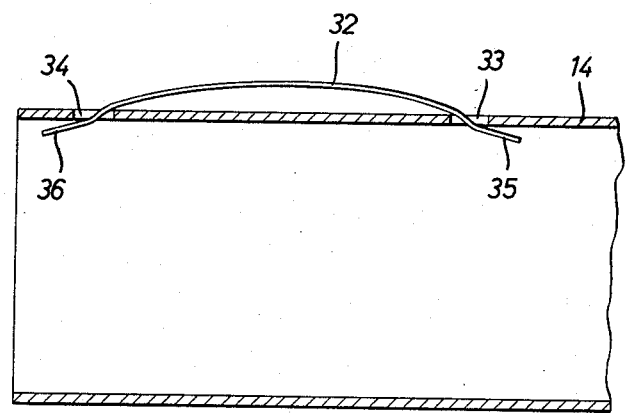
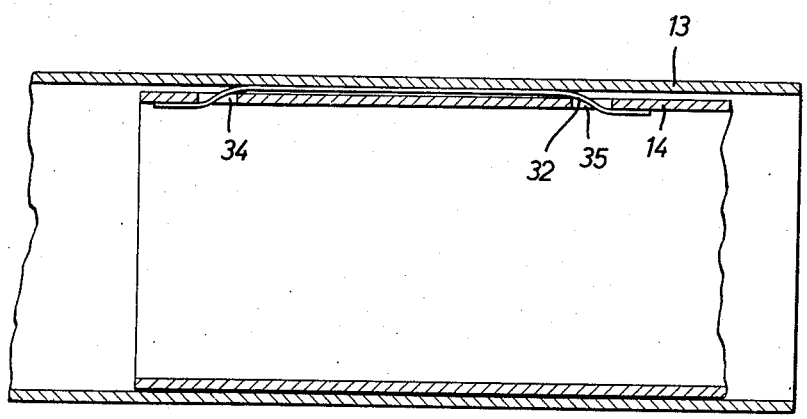
Fig. 11

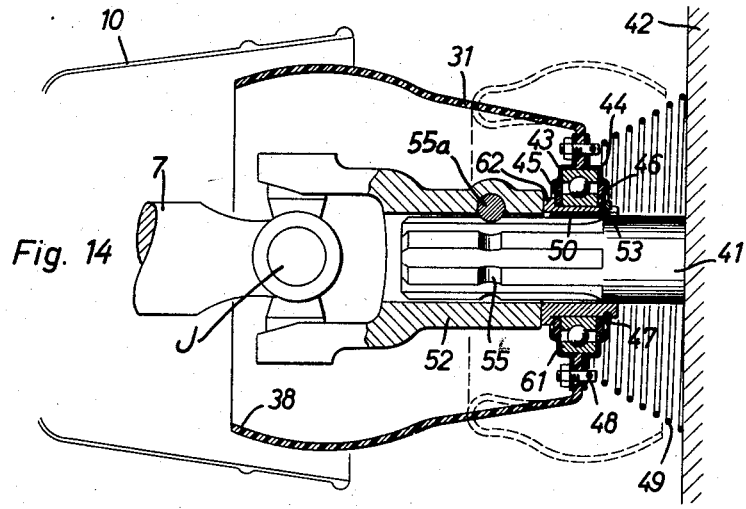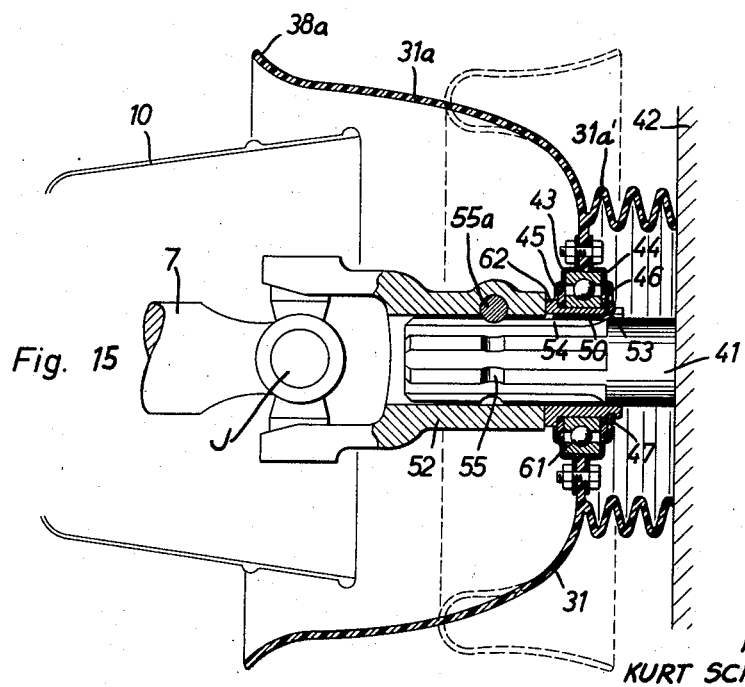

United States Patent Office 2,952,142
Patented Sept. 13, 1960

2,952,142

PROTECTIVE ARRANGEMENT

Kurt Schröter, Auf der Hardt, and Bernhard Walterscheid-Müller, Haus zur Buchbitze, both of Lohmar, Germany Filed Feb. 24, 1959, Ser. No. 795,088

Claims priority, application Germany Feb. 26, 1958

14 Claims. (Cl. 64—4)

The present invention relates to a protective arrangement for a mechanism, particularly agricultural machinery, having universal joints interconnected by a universal joint shaft.

It is an objective of the present invention to provide such a protective arrangement which is of simple and rugged construction, which will operate quietly, which can easily be mounted by unskilled personnel, which will not interfere with the operation of the shaft and joints and which will nevertheless fully protect the rotating parts so that there will be no danger of clothing or anything else being caught.

It is yet another object of the present invention to overcome the drawbacks of existing arrangements which are relatively complicated and which, when even slightly damaged, interfere with the proper running of the joints and shaft.

With the above objects in view, the present invention mainly resides in a plurality of telescopically arranged tubular members which are axially movable relative to each other, these members encompassing the shaft and having flaring end pieces encompassing the joints, respectively, connecting means for coupling the members to each other for movement in at least one direction, and attaching means for connecting the members to a stationary part of the mechanism for preventing rotation of the one member. Thanks to this construction, the above-mentioned objects and advantages are attained.

Additional objects and advantages of the present invention will become apparent upon a consideration of the following detailed description when taken in conjunction with the accompanying drawings in which:

Fig. 1 is a side view, partly in section, of one embodiment of the present invention;

Fig. 2 is a sectional view taken on line 2—2 of Fig. 1;

Fig. 3 is a plan view of one of the joints, with the protective arrangement removed;

Fig. 4 is an end view showing an especially simple way in which a flaring end piece may be attached;

Fig. 5 is a plan view of the arrangement shown in Fig. 4;

Fig. 6 is a fragmentary sectional view showing another way in which a flaring end piece may be attached;

Fig. 7 is a fragmentary perspective view of the flaring end piece shown in Fig. 6;

Fig. 10 is a sectional view of the inner one of the tubular members, the same carrying a spring adapted to cooperate with the outer tubular member;

Fig. 11 is a sectional view of the inner tubular member depicted in Fig. 10 after the outer tubular member has been slid on;

Fig. 14 is a sectional side view depicting a drive shaft attached to one of the universal joints, and a cup-shaped protective member mounted on the drive shaft; and Fig. 15 is a view similar to Fig. 14 except for the shape of the cup-shaped member.

Figure 8:
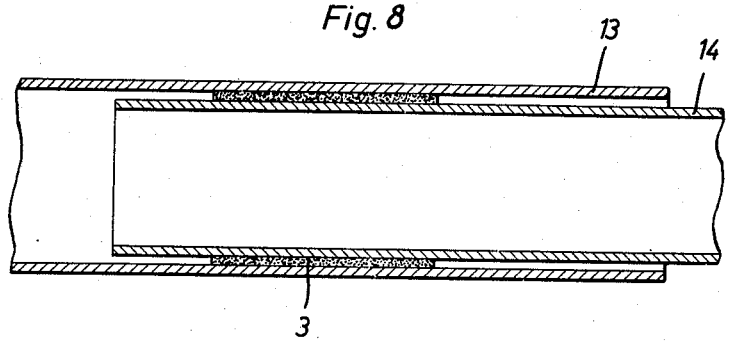
Fig. 8 is a sectional view showing one way in which the two telescoping members may be secured to each other.

Referring now to the drawings and to Figs. 1 to 3 thereof in particular, there is shown a protective arrangement for two universal joints J interconnected by a universal joint shaft 7. The protective arrangement comprises two telescopically arranged tubular members which encompass the shaft 7, the outer member being indicated at 13 and the inner one at 14. These two members are coupled to each other for movement in at least one direction by suitable connecting means, as, for example, by an elastic sleeve 12 made of any suitable material such as Perbunan or other synthetic rubber. This sleeve is on the end portion of member 13 under stress, and engages an intermediate portion of the inner member 14 with sufficient force so that there is enough friction to prevent rotation of the members relative to each other.

The tubular members carry at their free ends connecting pieces 1 which have diameters greater than those of the corresponding tubular member. In the illustrated embodiment these connecting pieces are shown as being stepped, but they may be of outwardly tapering shape instead.

Both tubular members are rotatably mounted on the shaft 7 by way of suitable bearings such as balls 15 which run on axially aligned inner and outer ball races. The inner ball race is constituted by a ring 3 and the outer race is formed partly by the connecting piece 1 and partly by a ring 5. Two sealing rings 8 are arranged on opposite axial sides under tension and form a lubricant chamber which can be filled by way of a nipple 17.

The ring 5 is secured to the connecting piece 1 by a number of screws 16 which, when loosened, permit the ring 5 to be removed so that the connecting piece can be slid off axially. The screws also serve as fastening means for removably mounting flaring end pieces 10 to the connecting pieces 1, these end pieces being made of a yielding material and encompassing the respective joint J.

On at least one of the members, two of the screws 16 also secure an angle-shaped eyepiece 9 to the connecting piece 1. This eyepiece 9 has one end of a tension member (not shown) attached to it, the other end of this tension member being connected to a stationary part of the mechanism so as to prevent rotation of the particular tubular members, and consequently of the entire protective arrangement incorporating the tubular members and the flaring end pieces, with respect to the shaft 7.

Figs. 4 and 5 show a simple arrangement for securing an eyepiece 9a and flaring end piece 10a to the connecting piece 1. Here the end piece is formed with a slotted cylindrical neck portion adapted to seat upon the connecting piece 1. The eyepiece 9a is formed with a web portion 9b having downwardly extending claws 9c which bite into the neck portion of the end piece 10a adjacent the slot 10a' thereof. The eyepiece 9a is screwed to the connecting piece 1 by a screw 16 the shank of which passes through the slot 10a'. Thus, the end piece can be removed simply upon loosening of the screw 16.

Figs. 6 and 7 show another way in which the end piece 10b may be attached to the connecting piece 1. Here the screws 16 (only one of which is shown) pass through corresponding elongated slots 10b' of the end piece 10b, which slots are formed with cutouts through which the enlarged heads 16a of the screws may pass, so that when the screws are loosened, the end piece may be slid axially on or off.

Figure 9:
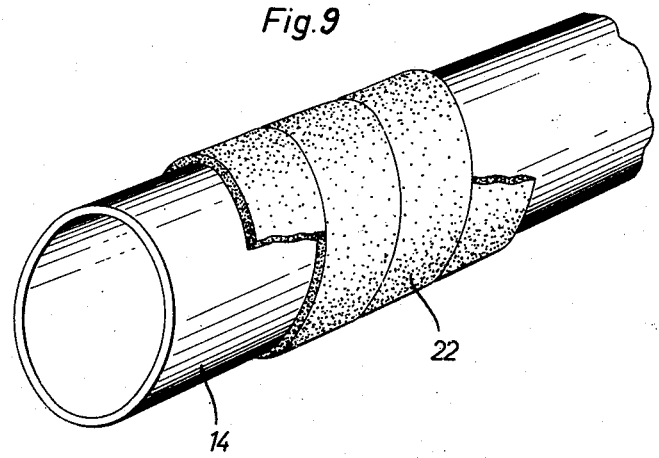
Fig. 9 is a perspective view showing another way in which the two telescoping members may be secured to each other.

Figs. 8 and 9 show the connecting means between the tubular members 13 and 14 as being in the form of a layer of elastic material interposed between the telescopically arranged members. Particularly in agricultural machinery, this layer is preferably made of a material that is non-reactive to mineral oils and/or chemical or synthetic fertilizers. In Fig. 8, this layer is constituted by a tubular sleeve 3 which is attached to either of the members, preferably the inner one, whereas in Fig. 9 the layer is constituted by a helical strip or band 22 wound tightly about the inner member 14. The latter embodiment has the particular advantage that the outer member may be easily placed upon the inner one by twisting it on with a pitch corresponding to that of the strip 22.

Figs. 10 and 11 show an arrangement in which the connecting means between the tubular members comprise spring means attached to one of the members and frictionally engaging the other. Thus, Fig. 10 shows the inner member 14 as being formed with axially spaced openings 33 and 34 which receive the bent end portions 35 and 36 of a leaf spring 32. When the outer member has not been slid upon the inner member, the spring 32 has the outwardly arched configuration illustrated in Fig. 10, so that when the outer member is slid on, the leaf spring 32 assumes the configuration shown in Fig. 11, the intermediate portion of the spring thus frictionally engaging the inner surface of the outer member 13.

Figure 12:
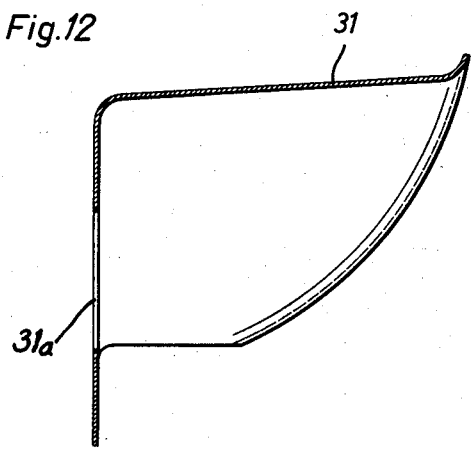
Fig. 12 is a side elevational view of a semi-round downwardly opening cover adapted to be mounted on the mechanism.
Figure 13:
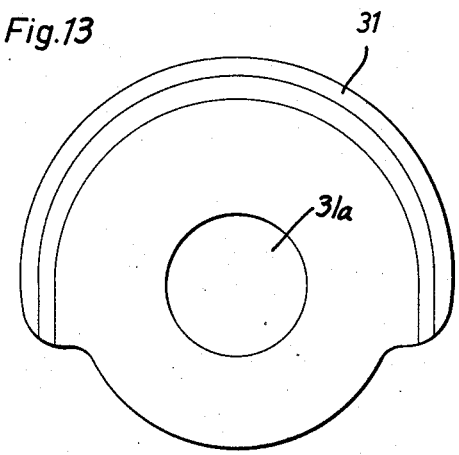
Fig. 13 is an end view of the cover depicted in Fig. 12.

Figs. 12 and 13 show a semi-round downwardly opening cover 31 which is carried by a stationary part of the mechanism (not shown). The cover is formed with an opening 31a through which a drive shaft connected to one of the universal joints passes, and is so dimensioned as to cover the flaring end piece of the above-described protective arrangement which encompasses the universal joint. In this way, the joint is effectively covered and protected.

If desired, not only the flaring end pieces of the tubular members but also the cover 31 may be made of yielding, non-metallic material.

Fig. 14 shows a universal joint J which interconnects the universal joint shaft and a drive shaft 41, the left-hand end of the shaft, as viewed in the drawing, being connected to a second universal joint (not shown in Fig. 14). Such an arrangement may be used in an agricultural machine.

The shaft 7 and the joints are protected by a protective arrangement as described above, of which only the right-hand flaring end piece 10 is shown, and additional protecting means are provided for the drive shaft and the joint J. These additional protecting means comprise a bearing sleeve 62 which is mounted on the drive shaft 41 ahead of the sleeve 52 which forms part of the joint J, this sleeve 52 being keyed on the drive shaft 41 and secured against axial displacement by a retaining pin 55a which is seated in a peripheral groove 55 of the drive shaft.

The bearing sleeve 62 carries a ball bearing 61, axial movement of which is prevented by a retaining ring 47, and a leaf spring 50 is arranged under tension in a longitudinal groove of the bearing sleeve. This leaf spring has an outward bent end portion 53 which is held between a sealing disk 46 and the retaining ring 47. The other end portion 54 of the spring is bent inwardly and is adapted to engage the peripheral groove 55 so as to prevent sliding off of the bearing sleeve from the drive shaft 41. However, if it is desired to remove the bearing sleeve, the spring force can be overcome by exerting a sufficiently great axial pull.

Two sealing disks 45 and 46 are provided at the collar of the bearing sleeve for sealing the ball bearing, and two cover disks 43 and 44 overlie the sealing disks and have their free ends screwed to a substantially cup-shaped member 31 which is made of yielding material. The member 31 normally extends toward the joint J and encompasses the same to occupy the position shown in solid lines wherein the inwardly tapering lip portion 38 is arranged interiorly of the flaring end piece 10. However, the member 31 may be bent backward to occupy the position shown in dotted lines so as to facilitate mounting and removal of the joint sleeve 52.

The screws 48 which secure the cover disks to the member 31 also serve to press the disks against the bearing. Furthermore, these screws are formed with transverse bores through which passes the first turn of a tapered coil spring 49 that surrounds the drive shaft 41. The other end of the coil spring abuts against the back wall 42 of the housing containing the driving mechanism (not shown) for the drive shaft 41. This back wall is a stationary part of the machine, so that the spring 49 serves as a coupling means to establish a frictional connection between such stationary part and the cup-shaped member 31. Thus, the member 31 is maintained stationary during rotation of the drive shaft.

Fig. 15 shows an embodiment similar to that of Fig. 14 except that the cup-shaped member 31a is formed with a bellows-like extension 31a' which is in frictional engagement with the wall 42', and serves as the coupling means which prevent rotation of the cup-shaped member 31a relative to the drive shaft. Also, the member 31a differs from the above-described member 31 in that the former has an outwardly flaring lip portion 38a which is arranged exteriorly of the flaring end piece 10. To facilitate mounting and removal of the joint sleeve 52, the member 31a may be bent backward to occupy the position shown in dotted lines.

It will be understood that the present invention is susceptible to modification in order to adapt it to different usages and conditions, and, accordingly, it is desired to comprehend such modifications within this invention as may fall within the scope and spirit of the appended claims.

What is claimed is:

1. In an agricultural machine having two universal joints interconnected by a universal joint shaft with one of said joints being also connected to a drive shaft, a protective arrangement comprising, in combination: a plurality of telescopically arranged tubular members encompassing said universal joint shaft and having flaring end pieces which encompass said universal joints, respectively, and a substantially cup-shaped member mounted on said drive shaft in such a manner that said drive shaft is freely rotatable with respect to said cup-shaped member, the latter extending toward and encompassing said one universal joint and being secured to a stationary part of the agricultural machine so as to be non-rotatable during rotation of said drive shaft.

2. In an agricultural machine having a universal joint interconnecting a universal joint shaft and a drive shaft, a protective arrangement comprising, in combination: a tubular member encompassing said universal joint shaft and having a flaring end piece which encompasses said joint, and a substantially cup-shaped member mounted on said drive shaft in such a manner that said drive shaft is freely rotatable with respect to said cup-shaped member, the latter extending toward and encompassing said universal joint and being secured to a stationary part of the agricultural machine so as to be non-rotatable during rotation of said drive shaft.

3. In an agricultural machine having a universal joint interconnecting a universal joint shaft and a drive shaft, a protective arrangement comprising, in combination: a tubular member encompassing said universal joint shaft and having a flaring end piece which encompasses said joint, a bearing sleeve carried by said drive shaft, a substantially cup-shaped member rotatably mounted on said bearing sleeve, said cup-shaped member extending toward and encompassing said joint, and coupling means coupling said cup-shaped member to a stationary part of the agricultural machine so that said cup-shaped member is stationary during rotation of said drive shaft.

4. A protective arrangement as defined in claim 3 wherein said coupling means comprise resilient means.

5. A protective arrangement as defined in claim 4 wherein said resilient means form a frictional connection between said cup-shaped member and said stationary part of the agricultural machine.

6. A protective arrangement as defined in claim 5 wherein said resilient means comprise a coil spring one end of which is passed through a transverse bore in a screw attached to said cup-shaped member.

7. A protective arrangement as defined in claim 5 wherein said resilient means comprise a coil spring the first turn of which is passed through transverse bores in screws attached to said cup-shaped member.

8. A protective arrangement as defined in claim 5 wherein said resilient means comprise a tapering coil spring interposed between said cup-shaped member and said stationary part of the agricultural machine.

9. A protective arrangement as defined in claim 3, further comprising roller bearing means interposed between said bearing sleeve and said cup-shaped member.

10. A protective arrangement as defined in claim 3 further comprising a pretensioned leaf spring arranged in a longitudinal groove of said bearing sleeve, said leaf spring having an outwardly bent end portion located between a sealing disk and a retaining ring mounted on said drive shaft, and having an inwardly bent end portion adapted to engage a peripheral groove formed in said drive shaft, whereby upon axial displacement of said drive shaft, said other end of said leaf spring will engage said peripheral groove of said drive shaft, thereby preventing sliding off of said bearing sleeve from said drive shaft while allowing removal of said bearing sleeve upon exertion of a sufficiently great axial force.

11. A protective arrangement as defined in claim 3 wherein said cup-shaped member is made of yielding material and is formed with a bellows-like extension which engages said stationary part of the agricultural machine and acts as said coupling means.

12. A protective arrangement as defined in claim 3 wherein said cup-shaped member has an inwardly tapering lip portion arranged interiorly of said flaring end piece of said tubular member.

13. A protective arrangement as defined in claim 3 wherein said cup-shaped member has an outwardly flaring lip portion arranged exteriorly of said flaring end piece of said tubular member.

14. A protective arrangement as defined in claim 3 further comprising a roller bearing carried by said bearing sleeve, said roller bearing being arranged between two support disks which cover two sealing disks and which, at their free ends, are screwed to said cup-shaped member.

References Cited in the file of this patent

UNITED STATES PATENTS

| | | |
|---|---|---|
| 1,871,883 | Geyer | Aug. 16, 1932 |
| 1,922,431 | Geyer | Aug. 15, 1933 |
| 2,015,688 | Ney | Oct. 1, 1935 |
| 2,027,329 | Van Ranst | Jan. 7, 1936 |
| 2,793,512 | Larsen | May 28, 1957 |
| 2,796,749 | Warner | June 25, 1957 |

FOREIGN PATENTS

| | | |
|---|---|---|
| 186,988 | Austria | Oct. 10, 1956 |